United States Patent
Kovacs et al.

[11] Patent Number: 6,086,125
[45] Date of Patent: *Jul. 11, 2000

[54] MAGNETIC HOLDING DEVICE

[75] Inventors: Nicholas Kovacs, Garden City; Cary Carruth, East China, both of Mich.

[73] Assignee: DaimlerChrysler Corporation, Auburn Hills, Mich.

[*] Notice: This patent is subject to a terminal disclaimer.

[21] Appl. No.: 09/394,830

[22] Filed: Sep. 13, 1999

Related U.S. Application Data

[63] Continuation-in-part of application No. 08/964,675, Nov. 5, 1997, Pat. No. 6,015,175.

[51] Int. Cl.⁷ .................................................. B66C 1/04
[52] U.S. Cl. .................................... 294/65.5; 294/88
[58] Field of Search ..................... 294/65.5, 2, 88, 294/64.1; 335/285, 295; 414/606, 737

[56] References Cited

U.S. PATENT DOCUMENTS

| | | |
|---|---|---|
| 1,685,707 | 9/1928 | Keedy . |
| 2,417,762 | 3/1947 | Koller . |
| 2,683,618 | 7/1954 | Long . |
| 2,976,075 | 3/1961 | Budreck . |
| 3,079,191 | 2/1963 | Engelsted et al. . |
| 3,200,931 | 8/1965 | Voorhies . |
| 3,250,962 | 5/1966 | Palme . |
| 3,257,141 | 6/1966 | Buus et al. . |
| 3,320,686 | 5/1967 | Blackburn . |
| 4,121,865 | 10/1978 | Littwin, Sr. .............................. 294/65.5 |
| 4,372,538 | 2/1983 | Balfanz . |
| 4,620,739 | 11/1986 | Coralline . |
| 4,648,786 | 3/1987 | Sakurai . |
| 4,722,283 | 2/1988 | Holley . |
| 4,784,562 | 11/1988 | Kishi et al. . |
| 4,928,577 | 5/1990 | Stoll ......................................... 92/177 |
| 4,943,098 | 7/1990 | Aoyama . |
| 4,943,099 | 7/1990 | Gabriel . |
| 4,973,027 | 11/1990 | Casas ................................... 254/93 R |
| 5,292,165 | 3/1994 | Wiklund . |
| 5,435,613 | 7/1995 | June . |
| 5,818,318 | 10/1998 | Ligthart et al. .......................... 335/295 |
| 5,845,950 | 12/1998 | Stowe et al. . |
| 5,882,171 | 3/1999 | Tinner et al. . |
| 6,015,175 | 1/2000 | Carruth et al. .......................... 294/65.5 |

FOREIGN PATENT DOCUMENTS

| | | |
|---|---|---|
| 1812103 | of 0000 | Sweden . |
| 1094296 | 9/1964 | United Kingdom . |

*Primary Examiner*—Dean J. Kramer
*Assistant Examiner*—Paul T. Chin
*Attorney, Agent, or Firm*—Lawrence J. Shurupoff

[57] ABSTRACT

A magnetic holding device includes a hollow cylinder having an axis and closed ends. A rodless piston having an elongated radial cross-section is slidable within the cylinder for movement between the ends. At least one magnet is carried by the piston. The piston is driven back and forth in the cylinder by air pressure. The magnet is adapted to pick up a workpiece adjacent to one end of the cylinder when the piston is driven toward that end of the cylinder.

15 Claims, 2 Drawing Sheets

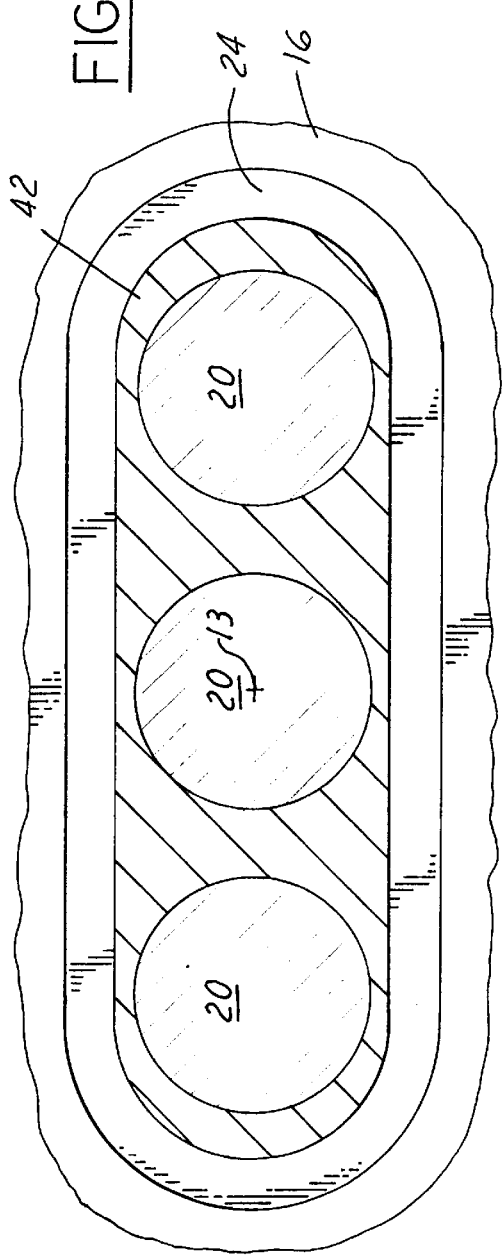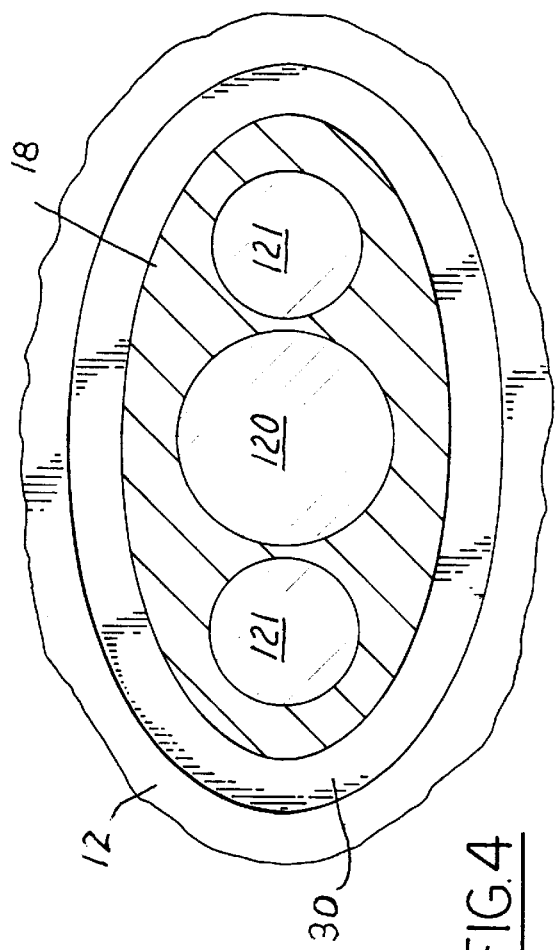

MAGNETIC HOLDING DEVICE

This Application is a continuation-in-part of prior Application Ser. No. 08/964,675, filed Nov. 5, 1997, now U.S. Pat. No. 6,015,175.

FIELD OF INVENTION

This invention relates generally to holding devices and more particularly to a magnetic device for holding parts.

BACKGROUND OF THE INVENTION

Parts, especially relatively small and narrow parts, are typically extracted from press lines by venturi vacuum cups. Shop air is used for this purpose. However, in practice, the parts are frequently dropped by the vacuum cups. For small, narrow parts, there is usually not enough surface area to properly locate a small cup. Also, vacuum cups must be set exactly to the contour of the part in order to be effective.

SUMMARY OF THE INVENTION

The holding device of this invention is designed to replace vacuum venturi cups and is faster on set up and more forgiving than vacuum cups and very reliable. The device of this invention can be operated with only a minimum amount of air, in contrast to the large volume of air required for venturi vacuum cups, thus saving plant air and being quiet in operation in contrast to the noise and whistling sounds typical of a venturi used to activate a vacuum cup. Also, a certain amount of oil from a compressor driving the air can vent into the plant when venturi cups are used. This is not a problem with a magnetic holding device. The device of this invention is formed of lightweight materials having a long life and preferably using a permanent magnet with maximum pick-up power. The device of this invention can be built in different sizes, to fit individual parts and enabling it to be used in other applications.

One object of this invention is to provide a magnetic holding device having the foregoing features and capabilities.

Another object of the invention is to provide a magnetic holding device which is composed of a relatively few simple parts, is rugged and durable in use, and is capable of being inexpensively manufactured and assembled.

These and other objects, features and advantages of the invention will become more apparent as the following description proceeds, especially when considered with the accompanying drawings.

BRIEF DESCRIPTION OF THE DRAWINGS

FIG. 3 is a sectional view taken on the line 3—3 in FIG. 1.

FIG. 4 is a bottom sectional view showing a modification of the device shown in FIG. 3 and showing magnets embedded directly within the piston.

DETAILED DESCRIPTION OF THE PREFERRED EMBODIMENTS

Figure 1:
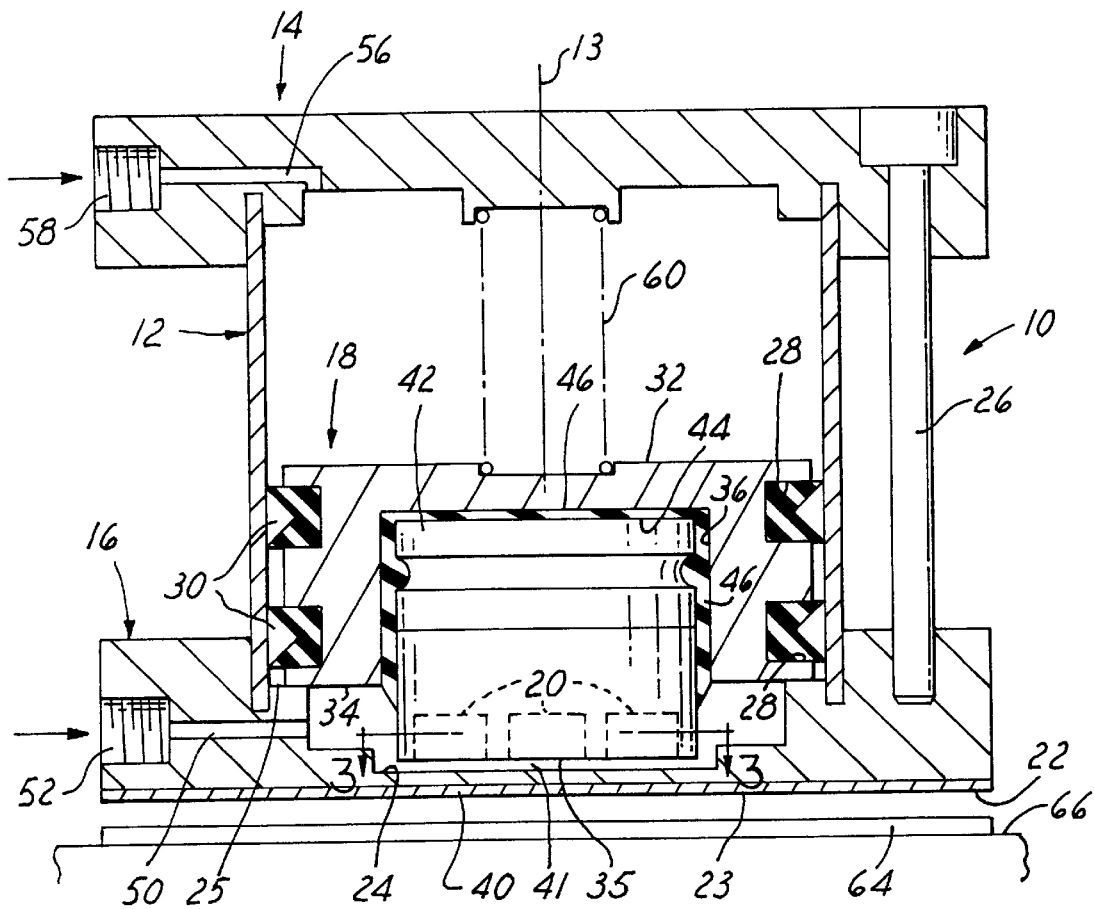
FIG. 1 is a sectional view of a magnetic holding device embodying the invention.

Referring now more particularly to the drawings, and especially FIGS. 1 and 3, there is shown a device 10 embodying the invention which includes a cylinder 12, end caps 14 and 16, a piston 18 and three magnets 20 carried by the piston 18.

The cylinder 12 has an axis 13 and an elongated radial cross-section. Preferably, cylinder 12 has a cross-section with elongated parallel sides and shorter rounded ends for A ease of manufacturing. The cross-section of cylinder 12 is similar to the cross-section of block 42 shown in FIG. 3. This elongated, generally oval cross-section of the cylinder and the matching oval cross-section of piston 18 prevent the piston from rotating within the cylinder 12. This reduces the wear on seals 30.

The cylinder 12 is open at both ends. The end cap 14 is fitted on and closes the upper end of the cylinder. The end cap 16 is fitted on and closes the lower end of the cylinder. The lower end cap 16 has a flat, planar outer wall 22 perpendicular to the longitudinal centerline of the cylinder. A thin, wear-resistant plate 23 of a non-magnetic material such as stainless steel is secured to the outer wall 22.

The lower end cap 16 has an inner wall formed with a flat planar central surface portion 24 parallel to the outer wall 22. The lower end cap 16 also has a step 25. The end caps are secured on the cylinder by any suitable means, as, for example, by socket head screws 26.

The lower end cap 16 at the central surface portion 24 is quite thin, preferably about 0.075 of an inch or less, and the plate 23 is also quite thin, preferably about 0.024 of an inch, so that the pick-up power of the magnets 20 extends through the lower end cap 16 without significant reduction.

The piston 18 is mounted in the cylinder 12 for sliding movement from one end of the cylinder 12 to the other. The piston 18 is fitted within the cylinder 12 and is formed with two peripheral grooves 28. Seals 30 within the grooves 28 seal against the inner wall of the cylinder 12. The piston 18 is rodless and has flat parallel end faces 32 and 34 which are perpendicular to the longitudinal centerline of the cylinder 12. The cylinder 12, end caps 14, 16 and piston 18 may be made of a suitable lightweight material, preferably aluminum.

The piston 18 can be formed with three aligned bores for directly receiving and mounting three magnets 20 within the piston such as shown in FIG. 4. Alternatively, as seen in FIG. 1, a single bore 36 can be formed in piston 18 to receive a ferromagnetic block 42. The magnets 20 are secured in the piston 18 or in sockets 36 with adhesives or by a friction fit. The magnets 20 extend downwardly beneath the lower face 34 of the piston. Each magnet 20 has a flat planar bottom surface 35 which is parallel to the flat planar central surface portion 24 of the end cap 16. The magnets 20 are preferably permanent magnets. A thin plate 40 of non-magnetic material is mounted to the lower exposed face of end cap 16 to prevent end cap from magnetically sticking to a workpiece when it is desired to raise the piston 18 away from the FIG. 1 position.

The lower end cap step 25 limits the travel of the piston 18 by contacting the piston lower face 34. At the point of contact between the step 25 and the lower face 34, the surfaces 24 and 35 are separated by a gap 41 of approximately 0.006 to 0.01 inches.

As shown in FIG. 1, the ferromagnetic block 42 is secured in the piston 20 in socket 36. The block 42 serves as magnetic flux concentrator or intensifier to enhance the lifting power of the magnets 20. The block 42 may be secured in socket 44 by any suitable means which may include utilizing rubber adhesive 46 which surrounds the sidewalls of the block 42 as well as its elongated inner wall 44.

The lower end cap 16 has a channel 50 which opens into the cylinder 12 beneath the piston 18 and communicates with a threaded bore 52 for receiving a threaded air hose fitting. The upper end cap 14 has a channel 56 which opens into the cylinder 12 above the piston 18 and communicates with a threaded bore 58 for receiving a second threaded air hose fitting.

Suitable control means, not shown, may be provided to introduce air under pressure to either one of the channels 50 or 56 while opening the other channel to exhaust. By introducing air under pressure through the channel 50 into the cylinder 12 beneath the piston 18 and opening the channel 56 to exhaust, the piston 18 may be raised. By introducing air under pressure to the upper channel 56 above the piston 18 and opening the channel 50 to exhaust, the piston 18 may be lowered to the position shown in FIG. 1. Rather than lowering the piston 18 by air pressure through the upper channel 56, the piston 18 may be lowered simply by gravity, assuming that the lower channel 50 is open. A spring 60 may, if desired, be employed to urge the piston 18 downwardly. The spring 60 is shown as a coil spring compressed between the top of the piston 18 and the upper end cap 14.

The device 10 may be mounted on the end of an arm or similar holder and inserted into a press to engage a workpiece or part 64 on the bed 66 of a press. With the piston 18 in the lower position shown in FIG. 1 and with the plate 23 on the bottom surface of the bottom end cap 16 contacting the part 64, the part 64 will be held by magnetic attraction. The device 10 with the part magnetically secured thereto may then be raised and removed from the press. When the piston 18 is thereafter raised to its upper limit, the magnets 20 will be spaced above the part far enough to cause the part 64 to be released. The piston 18 is raised and lowered within the chamber of the cylinder 12 of device 10 by the use of the air line connections previously described or by a combination of air pressure and simple gravity, assisted if desired by the compression spring 60.

FIG. 3 illustrates the linear arrangement of the magnets 20 embedded in steel block 42 on the piston 18. Although the magnets 20 are shown somewhat spaced apart, they can be placed in a more closely adjacent manner. The magnets 20 may also be other than circular in cross section. The piston 18 has generally straight elongated sides which are generally parallel to the straight sides of the cylinder. The piston 18 also has shorter rounded ends aligned with the rounded ends of the cylinder. The piston 18 cross-sectional configuration facilitates ease of manufacturing of the seal 30. Another benefit to the piston 18 configuration is that a part which has been picked up by the lifting device will not cause the piston 18 to rotate about its axis 13. Accordingly, any part picked up by the lifting device will be held in a more stable position. Also, wear on the seals due to piston 18 rotation will be eliminated.

Referring to FIG. 4, a modified lifting device has an oval shaped cylinder 12 with three adjacent magnets. The center magnet 120 is sized to be greater than its adjoining lateral magnets 121. Again, a benefit of the oval shape of the cylinder 12 and of the piston 18 is that an eccentrically picked-up part will not cause the piston 18 to rotate within its cylinder.

Figure 2:
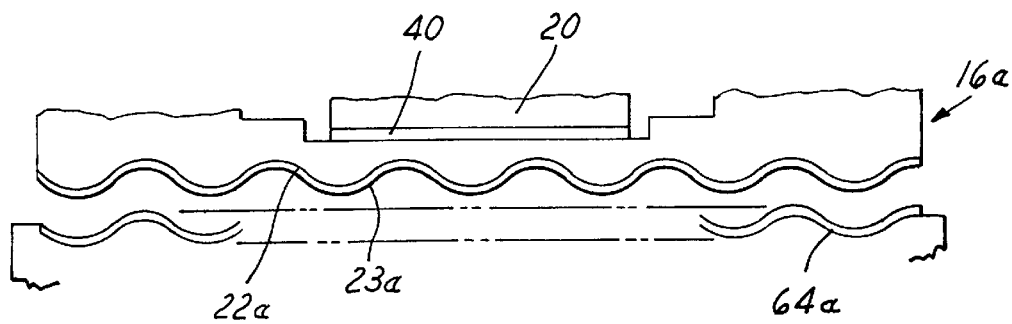
FIG. 2 is a fragmentary view showing a modification of the device shown in FIG. 1.

FIG. 2 illustrates a modification of the device of FIG. 1 in which the outer wall 22a of the bottom end cap 16a has a special configuration to match the configuration of the workpiece 64a. A thin plate 23a of non-magnetic material covers and is secured to the outer wall 22a. In this case, the outer wall 22a and plate 23a on the lower end cap and the workpiece have a wavy configuration, but obviously other configurations are possible. Since the bottom of the end cap is configured to match the configuration of the workpiece, a more effective contact and magnetic holding of the workpiece is achieved. Other than as illustrated, the embodiment of FIG. 2 is like that of FIG. 1.

We claim:

1. A magnetic holding device, comprising:
   a hollow cylinder having an axis and opposed first and second end portions;
   a piston having an elongated radial cross-section slidably mounted within said cylinder;
   at least one magnet carried by said piston;
   a first end cap provided on said first end portion of said cylinder;
   a second end cap provided on said second end portion of said cylinder;
   a first fluid port communicating with said cylinder adjacent said first end portion of said cylinder for driving said piston toward said second end portion of said cylinder;
   a second fluid port communicating with said cylinder adjacent said second end portion of said cylinder for driving said piston toward said first end portion of said cylinder; and
   said magnet being adapted to pick up a workpiece adjacent said first end cap when said piston is driven toward said first end portion of said cylinder.

2. The magnetic holding device of claim 1 wherein said cross-section of said piston is an oval.

3. The magnetic holding device of claim 1 wherein said cross-section of said piston has parallel sides and rounded ends.

4. The magnetic holding device of claim 1 wherein said piston has a plurality of magnets.

5. The magnetic holding device of claim 4 wherein said piston has three magnets.

6. The device of claim 4, wherein said magnets are linearly aligned.

7. The device of claim 4 wherein said magnets are the same cross-sectional size.

8. The device of claim 4 wherein said magnets are circular in cross section.

9. The device of claim 1, wherein said piston comprises a rodless piston having opposed flat end faces.

10. The device of claim 1, wherein said first end cap further comprises a non-magnetic wear resistant outer surface portion.

11. The device of claim 1, wherein said first end cap comprises a first annular side wall and wherein said first fluid port is formed through said first annular side wall.

12. The device of claim 1, wherein said first end cap comprises an outer surface having a non-uniform contour.

13. A magnetic holding device, comprising:
   a hollow cylinder having an axis and first and second ends;
   a rodless piston having a cross-section with parallel sides and rounded ends having a central bore formed therein, said piston being slidably mounted within said cylinder for movement between said first and second ends;
   three permanent magnets mounted within said bore of said cylinder;
   said piston further having at least one peripheral groove formed therein;
   a seal mounted within said peripheral groove and sealing against said cylinder;

a first end cap fitted over the first end of said cylinder;

a second end cap fitted over the second end of said cylinder; and a channel formed through said first end cap for permitting passage of fluid into and out of said cylinder; said magnets being adapted to pick up a workpiece adjacent said first end cap when said piston is moved to a position near said first end cap.

14. The device of claim 13, wherein said channel communicates with a threaded bore for receiving a threaded air hose fitting.

15. The device of claim 14, farther comprising a compression spring mounted within said cylinder between said second end cap and said piston, and biasing said piston toward said first end cap.

* * * * *